Feb. 23, 1971  M. M. GITLIN ET AL  3,565,517
SPECTACLES HAVING READILY REMOVABLE LENSES
Original Filed July 27, 1965
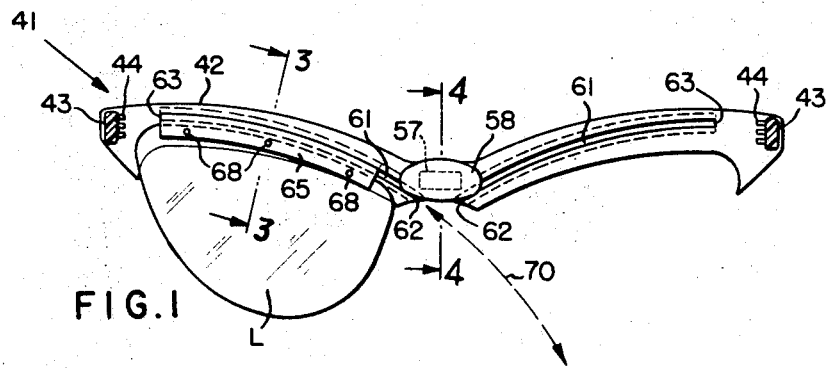
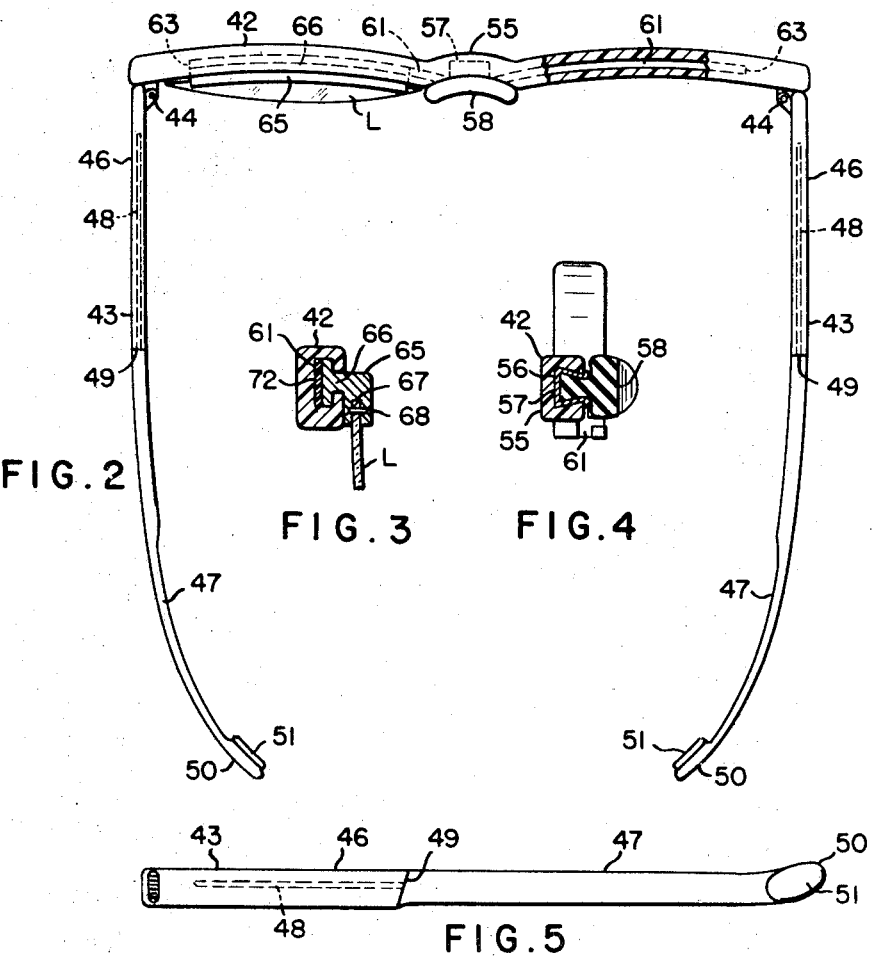
INVENTORS
MANUEL M. GITLIN
CHAUNCEY F. LEVY, Jr.
ATTORNEYS United States Patent Office 3,565,517
Patented Feb. 23, 1971

3,565,517
SPECTACLES HAVING READILY REMOVABLE LENSES
Manuel M. Gitlin, 68 Oakdale Drive 14623, and Chauncey F. Levy, Jr., 39 Wisner Road 14622, both of Rochester, N.Y.
Original application July 27, 1965, Ser. No. 475,288, now Patent No. 3,475,083, dated Oct. 28, 1969. Divided and this application Sept. 29, 1969, Ser. No. 861,642
Int. Cl. G02c *1/04*
U.S. Cl. 351—106           4 Claims

ABSTRACT OF THE DISCLOSURE

A spectacle frame has a resilient nose pad removably secured to the rear of its front section between a pair of curved grooves formed in the back of the front section. The grooves are closed at their outer ends, and open at their inner ends adjacent opposite sides of the nose pad. A pair of lenses are suspended from the front section by two lens supporting members, having flanged portions which are removably and frictionally seated in said grooves. When the nose pad is removed, the lenses can be removed from the frame by sliding the flanged portions of the supporting members out of the open ends of the grooves.

---

This application is a division of our copending U.S. application Ser. No. 475,288, filed July 27, 1965, now Pat. No. 3,475,083.

The present invention relates to spectacles, and more particularly to improved spectacle frames and lens mounts therefor.

The conventional spectacle frame usually includes a pair of spaced nasal pads for supporting the bridge of the frame on the nose of the person wearing the spectacles; and a pair of temples designed to pass over, and generally downwardly behind the ears of the wearer. The two lenses are usually mounted in lens rims that are releasably fastened to, or are integral with, the frame.

A major disadvantage of this type of frame is that, in order to replace the lenses supported on the frame, the frame must be destroyed or distorted; and in any event the replacement is so difficult that it should not be attempted except by a skilled technician. Moreover, the combined weight of the forward section of the spectacle frame, and the lenses supported thereby, is transmitted substantially vertically downwardly through the nasal pads to the nasal bridge of the person wearing the spectacles, thereby often causing indentation marks to be formed on the nose of the wearer. This problem is particularly acute in the case of cataract patients, and the like, who must wear particularly heavy lenses. Skin irritation and discomforting pain is not uncommon among these people; and in severe cases skin lesions and cancer have resulted from the pressure and slippage of the nasal pads against the flesh of the wearer.

Many such conventional frames are also designed to have an additional pair of tinted lenses releasably mounted in front of the regular lenses to function as sun glasses. The additional set of lenses and mounting means therefor only add further undesirable weight to the spectacle frame.

It has been found that certain areas of the skull, which lie in the temporal-parietal-occipital area behind and above the ear, are capable of sustaining moderate pressure for extended periods of time without causing any significant feeling of pain or discomfort. In has been found also that the area of the nose, which lies between the lower extremity of the forehead in the upper portion of the nasal bridge, is less sensitive to pressure than the areas of the nose, which are now utilized to support the nasal pads of conventional spectacle frames.

An object of this invention is to provide an improved, relatively light spectacle frame, which will not unduly irritate the nose and ear areas of the wearer.

An additional object of this invention is to provide an improved spectacle frame and removable lens mounting means therefor, which will considerably ease the mounting and replacement of lenses in the frame.

Another object of this invention is to provide an improved spectacle frame, which will be fitted to the skull of the wearer by substantially radial forces.

Other objects of the invention will be apparent hereinafter from the specification and from the recital of the appended claims, particularly when read in conjunction with the accompanying drawing.

In the drawing:

FIG. 1 is a rear elevational view of a spectacle frame and lens mount therefor made in accordance with one embodiment of this invention, parts thereof being shown in section, and, for purposes of clarity, only a single lens being shown mounted on the frame;

FIG. 2 is a plan view of this frame, parts thereof being broken away and shown in section;

FIG. 3 is an enlarged sectional view of this frame taken along the line 3—3 in FIG. 1 looking in the direction of the arrows;

FIG. 4 is a sectional view on the same scale as FIG. 3 and taken along the line 4—4 in FIG. 1 looking in the direction of the arrows; and FIG. 5 is a side elevational view of one of the temples, which forms part of this frame.

Referring now to the drawing by numerals of reference, 41 designates a spectacle frame comprising a front, lens supporting section 42, and a pair of temples 43, each of which is hinged in a conventional manner to the rear face of the frame section 42 by hinges 44. Each temple 43 comprises a generally straight, forward section 46, which is connected at one end thereof by one of the hinges 44 to the front frame section 42, and a rear or trailing section 47, which projects rearwardly from the forward section 46. Each section 46 is made from a plastic material of the type presently employed in certain conventional spectacle frames; and the sections 47 are made of stainless steel, or the like.

Integral with or otherwise secured to the forward end of each metallic temple section 47, and projecting into the rear end of the corresponding plastic temple section 46, is an elongate, metal rod 48, which has a reduced cross sectional area compared to its associated temple section 47. Each rod 48 is press fitted or otherwise secured in a corresponding longitudinal recess formed in the corresponding temple section 46, so that the confronting ends of the sections 46 and 47 in each temple abut one another as shown at 49.

The temples 43 lie, for major portions of their lengths, in a common plane that extends transverse to the plane containing the front section 42, so that when in use, they extend substantially horizontally rearwardly of the ears of the person wearing the frame 41. The temples 43 taper or thin-down adjacent their free ends (the rear ends of sections 47) and curve longitudinally inwardly toward one another. The terminal or free ends of the temple sections 47 are provided with enlarged skull pad areas 50, which curve vertically upwardly relative to the last-named plane to engage the posterior of one's skull in the parietal-temporal or occipital area. A resilient pad 51 may be secured, if desired, to the inside surface of each pad area 50.

Intermediate its ends the front section 42 of the frame 41 is provided with the usual bridge section 55, which is curved to accommodate the nasal bridge of the person wearing the frame 41. Removably secured by a metal snap 56 (FIG. 4) in a recess 57 formed in the rear face of the bridge section 55 is a resilient nose pad 58, which is made of padded leather, sponge rubber, or the like. The pad 58 is curved longitudinally of its ends to overlie the nasal bridge of the person wearing the spectacle frame.

At opposite sides of the intermediate bridge portion 55 the lens supporting portions of the frame section 42 are curved longitudinally. In its rear face each of these curved, lens supporting portions of the section 42 is provided with a groove 61, which is generally T shaped in cross section (FIG. 3), and which is curved longitudinally to form a segment of a sphere the center of which lies rearwardly of section 42. Each groove 61 curves about a different center or point. The grooves 61 are open at their inner ends 62 (FIG. 1) adjacent the bridge section 55, or opposite sides of the nose pad 58, and are closed at their outer ends 63 adjacent opposite ends, respectively, of the frame section 42.

Removably mounted on the rear face of the frame section 42 at opposite sides of the bridge section 55 art two, curved, lens supporting members 65, only one of which for purposes of clarity is illustrated in FIGS. 1 and 2. Projecting from the upper edge of each support member 65 is a T-shaped flange 66 (FIG. 3), which is curved spherically to fit slidably into one of the grooves 61 in the rear face of the frame section 42. In its under side each member 65 is provided with a groove 67 (FIG. 3) in which the upper edge of a conventional lens L is secured by means of a plurality of rivets 68.

Each lens L may be inserted or withdrawn from the frame 41 by first removing nose pad 58, then sliding the flange 66 of the lens support member 65 into or out of the open end 62 of one of the grooves 61 in the frame section 42. For instance, the arrows 70 in FIG. 1 illustrate the direction in which the left hand lens supporting member 65 should be swung in order to insert and withdraw, respectively, the left-hand lens L from the frame 41. The closed end 63 of each groove 61 limits the extent to which the corresponding lens supporting member 65 may be inserted into a respective groove 61, and assists in locating the lenses L so that they will properly register with the eyes of the person wearing the frame 41. After the insertion of the lenses L, the snap 56 carrying the nose pad 58 is reinserted into the recess 57, whereby opposite ends of the nose pad 58 overlie the open ends 62 of the grooves 61 to prevent accidental removal of the support members 65 therefrom.

The dimensions of each groove 61 and the cooperating flange 66 on the associated lens support member 65 are designed to create a slight wedging action or press fit between the frame section 42 and each flange 66, when a member 65 is fully seated in its corresponding groove 61, thereby frictionally to secure the section 42 and a respective member 65 one to the other. In addition, when the support members 65 are made of paramagnetic materials, such as steel or the like, an elongate magnet 72 (FIG. 1) may be secured to the frame section 42 at the bottom of each groove 61 to confront the flange 66 on the associated support member 65, thereby to provide additional means for preventing undesirable movement of the members 65 relative to the frame section 42. Instead of using a conventional, rigid magnet, the magnet 72 may be replaced by a compressible, magnetic, foamed liner, which would be compressed by, and which would frictionally engage the confronting flange 66 on the associated member 65. This liner may comprise a standard foamed plastic containing a magnetizable filler or magnetic particles.

It is anticipated that the mating surfaces of each groove 61 and flange 66 may have configurations other than segmental spherical, e.g., any simple or compound arcuate path, curving in horizontal and vertical planes simultaneously, in such manner that the flange 66 follows the same path as the groove 61 in the front frame section 42.

It is preferred that the above-described support members 65 be manufactured so that their grooves 67 come, by way of example, in three different sizes or shapes, thereby to accommodate at least three differently shaped lenses L. Moreover, since the interpupilary distance between the two lenses of a pair of spectacles may differ from person to person, it is anticipated that for a given frame this distance may be reduced by inserting small spacers in the grooves 61 between the closed ends 63 of the grooves 61 come, for example, in three different bers 65, or increased by removing these spacers. Moreover, if desired, the frames may be manufactured so that the grooves 61 come, for example, in three different lengths corresponding, respectively, to relatively small, medium and large interpupilary distances. Moreover, it will be understood that the temples 43 may be replaced, if desired, by other, conventional temples without departing from the scope of this invention.

From the foregoing it will be apparent that applicants' novel spectacle frames will prevent undesirable irritation of the wearer's skin in the areas of his or her nose and ears. The novel lens supporting section 42, which may be utilized in combination with conventional temples, permits the ready insertion and withdrawal of the associated lenses, and because of their adjustability may be manufactured in a minimum number of different sizes. This also permits sunglass lenses to be interchanged readily with the normal prescription lenses to further enhance the usefulness of the novel spectacle frame, and thus eliminates the need for mounting both the sunglass lenses and the normal prescription lenses on the frame at the same time.

Having thus described our invention, what we claim is:
1. A spectacle mounting, comprising
    a frame member having therein a pair of spaced grooves, each of which is curved longitudinally of its ends,
    two lens supporting members, each having thereon a curved flange which is removably seated in one of said curved grooves,
    a lens secured to each of said supporting members to be suspended thereby from said frame member,
    a nose pad removably mounted in a recess in said frame member between said grooves,
    each of said grooves having an open end through which the curved flange of the associated supporting member may be slidably removed, and
    said open ends of said grooves being located adjacent opposite sides, respectively, of said recess, and being positioned to be blocked by said nose pad to prevent movement of said two supporting members, through said open ends of said grooves, when said pad is mounted in said recess.
2. A spectacle mounting comprising
    a first lens supporting member having front and rear faces, respectively, said member having in one face thereof a pair of spaced grooves, each of which is curved longitudinally of its ends about one of two points spaced rearwardly of said rear face,
    two further lens supporting members, each of which is removably mounted in one said grooves,
    each of said further members having thereon a curved flange, which is removably seated in one of said grooves, and which conforms to the curvature thereof,
    a lens secured to each of said further members to be suspended thereby from said first member,
    each of said grooves being open at one end thereof, whereby each of said further members may be slidably removed from the open end of its associated groove by swinging it about one of said two points,
    a nose pad removably mounted in a recess in said rear face of said first member medially of its ends, said grooves being formed in said rear face of said first member at opposite sides of said recess, and said open ends of said grooves being located adjacent opposite sides, respectively, of said recess and being positioned to be blocked by said nose pad to prevent movement of said two further members through said open ends of said groove, when said pad is mounted in said recess.

3. A spectacle mounting as defined in claim 2, wherein a magnet is secured in each of said grooves, and at least the flange on each of said two further members is made of magnetizable material.

4. A spectacle mounting as defined in claim 3, wherein each of said grooves and each of said flanges is generally T-shaped in cross section, and each of said magnets comprises a compressible, foamed plastic containing magnetic particles.

References Cited

FOREIGN PATENTS

| 984,493 | 2/1965 | Great Britain | 351—108 |
| 915,421 | 7/1946 | France | 351—154 |
| 1,310,129 | 10/1962 | France | 351—103 |
| 285,411 | 9/1913 | Germany | 351—136 |

DAVID SCHONBERG, Primary Examiner

J. W. LEONARD, Assistant Examiner

U.S. Cl. X.R.

351—138, 154, 178